United States Patent [19]

Saeki et al.

[11] Patent Number: 5,610,450
[45] Date of Patent: Mar. 11, 1997

[54] POWER SUPPLY APPARATUS FOR EFFICIENTLY UTILIZING BATTERY AND ELECTRONIC APPARATUS USING THE POWER SUPPLY

[75] Inventors: Mituo Saeki; Tsutomu Suzui; Hidekiyo Ozawa; Hisafumi Mitsui, all of Kawasaki, Japan

[73] Assignee: Fujitsu Limited, Kawasaki, Japan

[21] Appl. No.: 496,617

[22] Filed: Jun. 29, 1995

[30] Foreign Application Priority Data

Nov. 10, 1994 [JP] Japan ................................. 6-276359

[51] Int. Cl.⁶ ..................................................... H02J 1/16
[52] U.S. Cl. .................................. 307/46; 307/43; 307/44; 307/45; 363/101
[58] Field of Search ........................ 307/43, 44, 45, 307/46; 363/101

[56] References Cited

U.S. PATENT DOCUMENTS 4,404,624  9/1983  Yamazaki ..................... 363/59
4,522,480  6/1985  Kawabata et al. ............... 354/468
5,140,229  8/1992  Yagi et al. ...................... 315/307

Primary Examiner—William M. Shoop, Jr.
Assistant Examiner—Kim Lockett
Attorney, Agent, or Firm—Nikaido, Marmelstein, Murray & Oram LLP

[57] ABSTRACT

A booster type DC-DC conversion circuit and a voltage reduction type DC-DC conversion circuit are connected in series with a battery. When battery voltage is high, the booster type DC-DC conversion circuit does not operate, and the voltage reduction type DC-DC conversion circuit outputs a constant voltage lower than the battery voltage. When the battery voltage drops, the booster type DC-DC conversion circuit operates, and converts the battery voltage to a constant voltage higher than the operation voltage of the voltage reduction type DC-DC conversion circuit. The voltage reduction type DC-DC conversion circuit outputs a constant voltage. The power supply apparatus can continuously output a constant voltage from when the battery voltage is high until it becomes low, and can efficiently utilize the battery capacity.

8 Claims, 2 Drawing Sheets

POWER SUPPLY APPARATUS FOR EFFICIENTLY UTILIZING BATTERY AND ELECTRONIC APPARATUS USING THE POWER SUPPLY

BACKGROUND OF THE INVENTION

1. Field of the Invention

This invention relates to a power supply apparatus capable of efficiently utilizing a built-in battery, and an electronic apparatus using the power supply apparatus.

2. Description of the Related Art

Portable electronic apparatuses such as notebook type personal computers, portable telephone sets, and so forth, have been widely used in recent years. A battery is built in as the power supply of such electronic apparatuses. However, because the voltage of the battery generally drops with the progress of discharge, the battery output has been stabilized by a DC-DC conversion circuit so as to keep the voltage used in the electronic apparatus main body constant.

On the other hand, the electronic apparatuses of the type described above can utilize an external D.C. power supply by utilizing an A.C. adaptor, and a voltage higher than the rated voltage used in the electronic apparatus main body is input in order to charge a rechargeable battery by an external D.C. power supply. For this purpose a voltage reduction type DC-DC conversion circuit is used, which executes a voltage reduction operation for using the battery power supply. When the battery voltage drops, however, the voltage reduction type DC-DC conversion circuit does not operate, and this is the problem to be yet solved.

When the electronic apparatus is operated by the built-in battery without being connected to the external power supply, the battery voltage drops with the progress of discharge, but the input from the battery is regulated by the voltage reduction type DC-DC conversion circuit and outputs a predetermined voltage as a driving voltage of each portion of the electronic apparatus main body such as 5.0 V, for example. On the other hand, in the voltage reduction type DC-DC conversion circuit, the input voltage must be higher than the output voltage, because there is an input/output voltage ratio which is proportional to a voltage drop across transistors and a choke coil in the conversion circuit and to an input/voltage ratio proportional to an ON/OFF ratio of the transistor. Generally, a minimum input voltage required for obtaining a 5.0 V output is about 6.0 V.

On the other hand, when two lithium ion secondary batteries (Li+) of 4.2 V per cell, which will be a predominant battery in the future as the power supply of the electronic apparatuses, are connected in series and are used, the voltage is 8.4 V at the time of the full charge state, but as discharge proceeds, the battery voltage drops and discharge finishes finally at 5.0 V. However, because the voltage reduction type DC-DC conversion circuit does not operate at a voltage below 6.0 V, discharge of the battery must be stopped at 6.0 V.

In this case, though the battery has the capacity to discharge down to 5.0 V, the remaining 1.0 V cannot be used. There is a difference of about 10% between the case where this battery is discharged to 5.0 V and the case where discharge is stopped at 6.0 V. Therefore, if the Li+ battery is used for the voltage reduction type DC-DC conversion circuit requiring the 5.0 V output, only about 90% of the battery capacity can be used and the remaining about 10% becomes useless. In other words, there remains the problem that the battery cannot be used at maximum efficiency.

To cope with this problem, a method has been proposed which connects three lithium ion secondary batteries (Li+) in series, but in this case, the voltage at the time of full charge becomes 16.8 V, and this voltage is close to the limit of withstand voltages of ordinary components of the power supply. This voltage does not cause any problem, in particular, when the battery is discharged, but in consideration of the charging operation of the battery, the voltage necessary for charging the 16.8 V battery is at least 18.0 V and this exceeds the limit of the ordinary components. Thus, another problem develops. Efficiency of the voltage reduction type DC-DC conversion circuit becomes higher when the difference between the input voltage and the output voltage is smaller, and is likely to drop with the increasing difference between the input and output voltages. Therefore, in consideration of voltage reduction type DC-DC conversion efficiency, it is not preferred to set the battery voltage to a high level.

To solve the problem described above, there is a system which uses a booster/reduction type DC-DC conversion circuit and can always output a required voltage both when the battery voltage is higher than the output voltage and when it is lower than the output voltage.

However, whereas power conversion efficiency is from 90 to 95% in the voltage reduction type DC-DC conversion circuit, it is as low as from 75 to 85% in the booster type DC-DC conversion circuit and is extremely low, i.e. about 60%, in the booster/reduction type DC-DC conversion circuit. As described above, when the booster/reduction type DC-DC conversion circuit is used, efficiency of the use of the battery becomes deteriorated. More concretely, we consider the case of the lithium ion secondary battery (Li+), for example. In the case of the voltage reduction type circuit, the loss due to DC-DC conversion is 10% and the unused voltage of the battery at the time of the voltage drop is 10%, or in other words, the total loss is about 20%. In the case of the booster/reduction type circuit, the loss due to DC-DC conversion is 40% and this value is twice as bad as the voltage reduction type with respect to efficiency of the battery use.

To solve the problems of the voltage reduction type DC-DC conversion circuit and the booster/reduction type conversion circuit, a system has been proposed which connects in parallel the voltage reduction type DC-DC conversion circuit and the booster type DC-DC conversion circuit, operates the voltage reduction type DC-DC conversion circuit when the battery voltage is high and operates the booster type DC-DC conversion circuit when the battery voltage is lower than a predetermined voltage.

According to this system, the booster type DC-DC conversion circuit is connected in parallel with the voltage reduction type DC-DC conversion circuit. In the booster type DC-DC conversion circuit, however, the input voltage passes to the output side when the input voltage is higher than the output voltage. Therefore, the input of the booster type DC-DC conversion circuit must be cut off by a switch in such a case. Further, when the conversion circuit is changed over from the voltage reduction type to the booster type, a penetration voltage appears on the output side. In other words, the high input voltage appears as the output voltage.

In the voltage reduction type DC-DC conversion circuit, power can be supplied from a choke coil to a load in both ON and OFF cycles of a switching transistor, but in the booster type DC-DC conversion circuit, power can be supplied from the choke coil to the load only in the OFF cycle of the main switching transistor. As a result, the booster type DC-DC conversion circuit has a time lag from the start of the DC-DC conversion operation until the output of the rated output voltage. Further, the voltage reduction type DC-DC conversion circuit requires the input voltage be somewhat higher than the output voltage, as explained above. As a result, in the system wherein the voltage reduction type and the booster type DC-DC conversion circuits are connected in parallel, there is a gap between the battery voltage at which the voltage reduction type DC-DC conversion circuit can operate normally and the battery voltage at which the booster type DC-DC conversion circuit normally starts its operation.

In a power supply apparatus which connects the voltage reduction type DC-DC conversion circuit in parallel with the booster type DC-DC conversion circuit, there is another system which delays a switching time from the voltage reduction type DC-DC conversion circuit to the booster type DC-DC conversion circuit in order to prevent penetration of the input voltage. In this case, the voltage reduction type DC-DC conversion circuit is operated until the battery voltage drops to a voltage near the output voltage, and thereafter the booster type DC-DC conversion circuit is operated. Accordingly, penetration of the battery voltage becomes less, but because the output voltage drops in the switching period, there remains the problem in stabilization of the output voltage.

In the power supply apparatus wherein the voltage reduction type DC-DC conversion circuit and the booster type DC-DC conversion circuit are connected in parallel, the output voltage supplied to the load becomes discontinuous at the time of switching from the voltage reduction type to the booster type, and a step-like change occurs. Such a step-like change of the voltage results in a fatal problem in the electronic apparatus including a digital data processing circuit comprising semiconductor devices, and invites erroneous operation of the electronic apparatus.

SUMMARY OF THE INVENTION

It is an object of the present invention to provide a power supply apparatus which uses a battery as the power supply and can keep an output voltage constant even at the time of the drop of the battery voltage while using voltage reduction type and booster type DC-DC conversion circuits, and an electronic apparatus using such a power supply apparatus.

It is another object of the present invention to provide a power supply apparatus capable of efficiently utilizing a battery capacity, and an electronic apparatus using such a power supply apparatus.

To accomplish the objects described above, the present invention connects a battery, a booster type DC-DC conversion circuit and a voltage reduction type DC-DC conversion circuit in series. When the battery voltage is high, the operation of the booster type DC-DC conversion circuit is inhibited, the battery voltage is output, and the voltage reduction type DC-DC conversion circuit outputs a constant voltage lower than the input voltage. As discharge of the battery proceeds and the battery voltage drops, the booster type DC-DC conversion circuit converts the battery voltage to a high constant voltage by the operation voltage of the voltage reduction type DC-DC conversion circuit. The voltage reduction type DC-DC conversion circuit converts the output voltage of the booster type DC-DC conversion circuit to a lower constant voltage.

This power supply apparatus can use the battery as the power supply even when the battery voltage drops to a level lower than the operation voltage of the voltage reduction type DC-DC conversion circuit, and can therefore utilize the battery capacity without any waste. Because the output of the power supply apparatus is a constant voltage from the high to low regions of the battery voltage, an electronic apparatus using this power supply apparatus is free from erroneous operation due to the fluctuation of the power supply voltage.

The power supply apparatus according to the present invention can connect an external power supply to the input side of the voltage reduction type DC-DC conversion circuit. When this external power supply is used, the operation of the booster type DC-DC conversion circuit is inhibited.

Further, the power supply apparatus according to the present invention can utilize a charger for charging the battery from the external power supply.

BRIEF DESCRIPTION OF THE DRAWINGS

The above and other objects and features of the present invention will become more apparent from the following description of the preferred embodiment with reference to the accompanying drawings, wherein.

DESCRIPTION OF THE PREFERRED EMBODIMENTS

Figure 1:
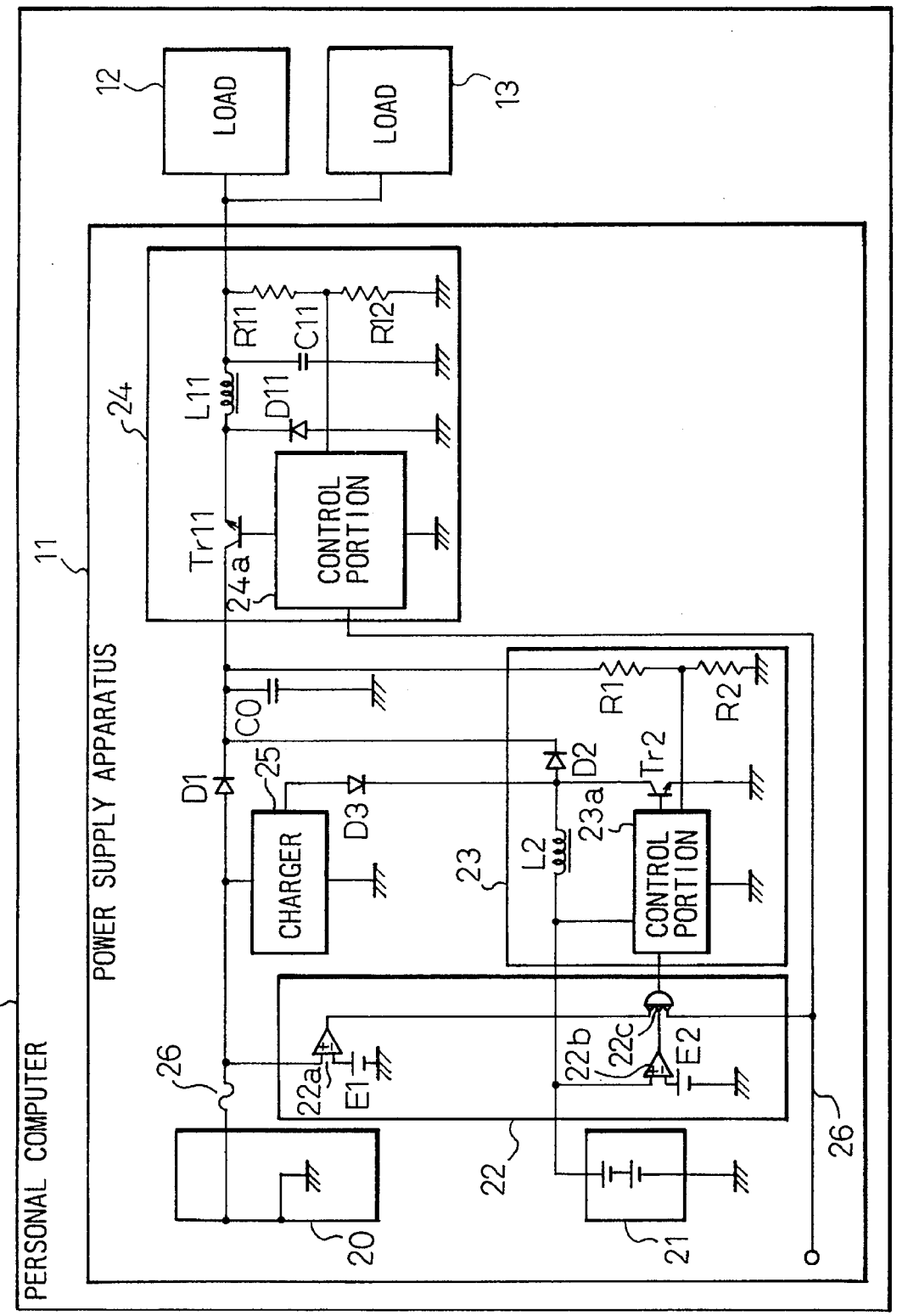
FIG. 1 is a circuit diagram of an embodiment of a power supply device according to the present invention and an electronic apparatus using the power supply device.

In FIG. 1, reference numeral 10 denotes a personal computer, reference numeral 11 denotes a power supply device, and reference numerals 12 and 13 denote loads of the personal computer. Reference numeral 20 denotes a DC-IN connector, and reference numeral 21 denotes a chargeable battery, which is a lithium ion secondary cell (Li+) in this embodiment. Reference numeral 22 denotes a detection circuit for detecting a voltage value of the battery 21, an input state of an external power supply and a later-appearing control signal and supplying a signal to a booster type DC-DC conversion circuit 23. Reference numeral 23 denotes the booster type DC-DC conversion circuit, reference numeral 24 denotes a voltage reduction type DC-DC conversion circuit, reference numeral 25 denotes a charger and reference numeral 26 denotes a control signal line to which signals for controlling the operations of the booster type DC-DC conversion circuit 23 and the voltage reduction type DC-DC conversion circuit 24 are supplied. This control signal line supplies a "1" signal when a power switch of the personal computer, not shown, is turned ON and a "0" signal when the power switch is turned OFF. Since the content of the charger 25 is well known in the art, its explanation will be omitted.

In the detection circuit 22, reference numeral 22a denotes a voltage comparator, which detects whether or not an external D.C. power supply voltage is above a reference voltage E1. Reference numeral 22b denotes a voltage comparator, which detects whether or not a battery voltage is above a reference voltage E2 (at least 6 V in the case of a lithium battery). Reference numeral 22c denotes a NAND circuit for effecting ON/OFF control of the control portion 23a of the booster type DC-DC conversion circuit 23. This circuit generates "1" and executes ON control when all the outputs of the voltage comparators 22a, 22b and the control signal from the control signal line 26 are "0", and generates "0" and executes OFF control at other times.

Symbol D1 denotes a backflow prevention, or blocking, diode for preventing power from leaking outside through the DC-IN connector 20 when the personal computer 10 operates by using its built-in battery 21, and symbol D2 denotes a charge prevention protective diode for preventing a charging current from flowing into the built-in battery 21 when external power is supplied from the DC-IN connector 20. Symbol D3 denotes a blocking diode for preventing power of the built-in battery from leaking to the charger side when the charger 25 is halted, and reference numeral 26 denotes a fuse.

In the voltage reduction type DC-DC conversion circuit 24, symbol Tr11 denotes a main switching transistor which is ON/OFF controlled by the control portion 24a, symbol L11 denotes a choke coil, symbol C11 denotes a smoothing capacitor, symbol D11 denotes a flywheel diode for rectification, and symbols R11 and R12 denote sensor resistors for detecting the output voltage of the voltage reduction type DC-DC conversion circuit 24, and the control portion 24a operates by this detection voltage. Since the content of the control portion 24a is well known, its explanation will be omitted.

The voltage reduction type DC-DC conversion circuit 24 regulates external power from the DC-IN connector 20 or power from the battery 21 or from the booster type DC-DC conversion circuit 23 to a rated voltage required by the electronic apparatus. The capacitor C0 is an input capacitor for the voltage reduction type DC-DC conversion circuit 24.

In the booster type DC-DC conversion circuit 23, the transistor Tr2 is a transistor for main switching, L2 is a choke coil, and R1 and R2 are sensor resistors for detecting the output voltage of the booster type DC-DC conversion circuit 24. The control portion 24a operates by this detection voltage. The diode D2 is the blocking diode described above and at the same time, it is a rectification diode, too. The input capacitor C0 functions also as a smoothing capacitor of the output of the booster type DC-DC conversion circuit 23. Since the content of the control portion 23a is well known, its explanation will be omitted.

Next, the circuit operation shown in FIG. 1 will be explained with reference to FIG. 2.

When an AC adaptor, etc., is connected to the DC-IN connector 20 and power is supplied from outside, this external power is supplied to the voltage reduction type DC-DC conversion circuit 24 through the diode D1. The voltage of external power of the AC adaptor, etc., is set to a value higher than the voltage of the built-in battery 21. Therefore, the diode D2 is back-biased and power is not supplied from the battery 21 to the voltage reduction type DC-DC conversion circuit 24. The output of the voltage comparator 22a in the state where external power is supplied from the DC-IN connector 20 is "1", and the output of the NAND circuit 22c is "0" without depending on other signals. Therefore, the booster type DC-DC conversion circuit 23 stops its operation. The charger 25 starts its charging operation upon detection that the voltage of the battery 21 drops below the rated value.

When external power is not supplied from the DC-IN connector 20, power is supplied from the built-in battery 21 to the voltage reduction type DC-DC conversion circuit 24 through the diode D2. When the voltage of the battery is higher than the operation voltage of the voltage reduction type DC-DC conversion circuit 24, the voltage comparator 22b of the detection circuit 22 outputs the "1" signal. As a result, the NAND circuit 22c delivers the "0" signal to the booster type DC-DC conversion circuit 23 without depending on the state of other signals, and inhibits the operation of this booster type DC-DC conversion circuit 23. In this case, power of the battery 21 is supplied to the voltage reduction type DC-DC conversion circuit 24, and the voltage reduction operation is carried out. The relation between the battery voltage and the output voltage of the voltage reduction type DC-DC conversion circuit 24 in this state is shown on the left side of FIG. 2.

Since the choke coil L2 of the booster type DC-DC conversion circuit 23 is connected in series with the power supply line at this time, the power supply line resistance increases to an extent corresponding to the D.C. resistance component of the choke coil, and the power loss becomes great. However, the D.C. resistance of the choke coil L2 is substantially equivalent to the D.C. resistance of the printed board due to the power supply line, falls within the range of the error from the aspect of the resistance value of the overall circuit, can be neglected, and hardly affects conversion efficiency of the DC-DC conversion circuit 23.

Figure 2:
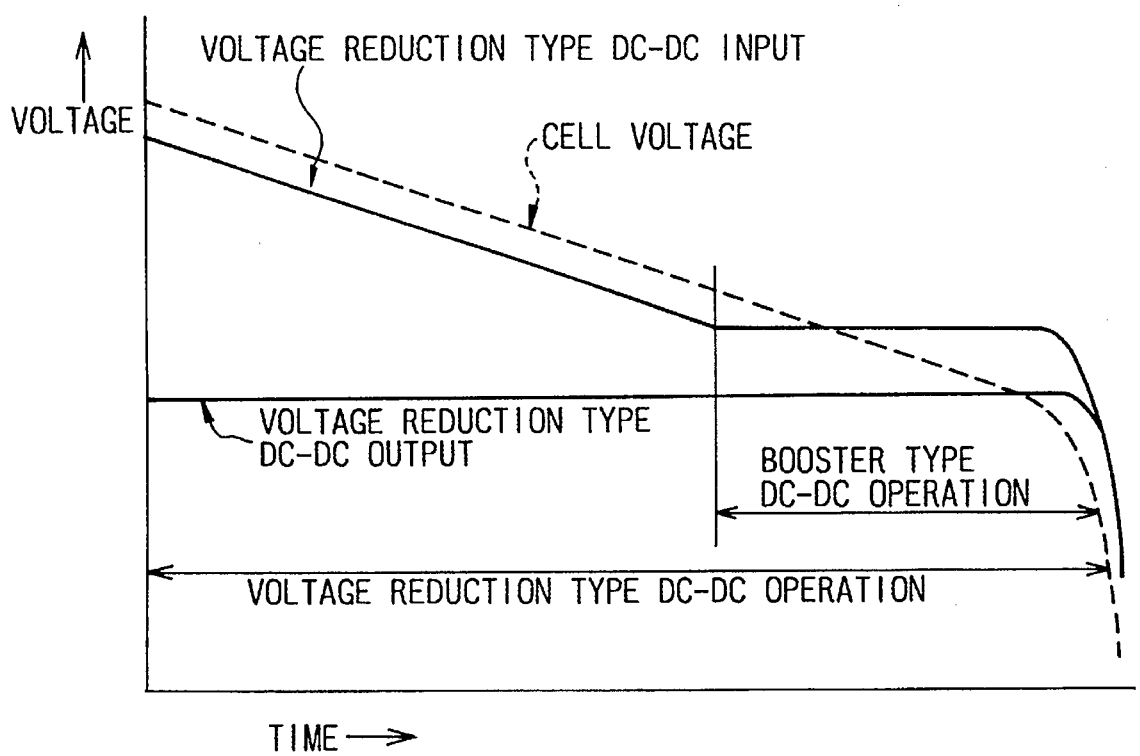
FIG. 2 is a graph showing the relationship between a battery voltage and an output voltage of the power supply device in the circuit shown in FIG. 1.

When the built-in battery 21 continues to supply power through the power diode D2 in the state where external power is not supplied from the DC-IN connector 20, the voltage drops with the progress of discharge of the battery 21 as shown in FIG. 2. When discharge of the battery 21 proceeds and drops below a voltage at which the voltage reduction type DC-DC conversion circuit 24 can operate, the voltage comparator 22b outputs the "0" signal. At this time, the signal from the voltage comparator 22a, too, is in the "0" state, and the signal of the control signal line 26, too, is in the "0" state which permits the DC-DC conversion operation. Accordingly, all the three inputs of the NAND circuit 22c are in the "0" state, and the "1" signal is generated from the output of the NAND circuit 22c, and the booster type DC-DC conversion circuit 23 starts its operation.

In consequence, the booster type DC-DC conversion circuit 23 starts operating the instant that the voltage of the battery 21 is below the operation limit voltage of the voltage reduction type DC-DC conversion circuit 24, so that the voltage boosted by the booster type DC-DC conversion circuit 23 is supplied to the voltage reduction type DC-DC conversion circuit 24. As a result, even when the battery voltage is below the operation limit voltage of the voltage reduction type DC-DC conversion circuit, the input voltage of the voltage reduction type DC-DC conversion circuit 24 is insured, and the DC-DC conversion operation can be continued.

The relationship between the battery voltage and the output voltage of the voltage reduction type DC-DC conversion circuit 24 after the start of the operation of the booster type DC-DC conversion circuit 23 is shown on the right side of FIG. 2. No change occurs in the output voltage when the booster type DC-DC conversion circuit is driven.

As the booster type DC-DC conversion circuit 23 operates, DC-DC conversion efficiency is determined by both efficiency of the booster type DC-DC conversion circuit and that of the voltage reduction type DC-DC conversion circuit. Therefore, efficiency of the DC-DC conversion circuits as a whole becomes low. However, because the battery voltage can be used at a range which has not been able to be used in the past, efficiency of the use of the battery can be eventually improved.

In the present invention, further, the voltage reduction type DC-DC conversion circuit always operates and outputs the predetermined output voltage, whereas the booster type DC-DC conversion circuit operates so as to boost the input voltage of the voltage reduction type DC-DC conversion circuit when the battery voltage drops below a predetermined value. Therefore, it generates a output voltage which is always stable without depending on the battery voltage and on the ON/OFF operation of the booster type DC-DC conversion circuit. Moreover, the problem encountered in the conventional booster type system, that is, the drop of conversion efficiency, can be eliminated.

According to the present invention, in an electronic apparatus operating by a battery, the voltage is allowed to pass through by stopping the booster type DC-DC conversion circuit when the battery is fully charged and the battery voltage is high. Therefore, the power can be supplied without causing a particular power loss. When the voltage is below the predetermined value, the booster type DC-DC conversion circuit and the voltage reduction type DC-DC conversion circuit are operated, and the battery voltage is raised to the level at which the voltage reduction type DC-DC conversion circuit can operate. Accordingly, the battery can be used till the end of the discharge of the battery.

More concretely, when a lithium ion secondary battery (Li+) is used as the built-in battery of an electronic apparatus, for example, the discharge end voltage of Li+ is 5.0 V. However, because the DC-DC conversion circuit for outputting this 5.0 V cannot be used unless an input voltage of at least about 6.0 V is available, about 10% remains unused. Therefore, discharge until the discharge end voltage of 5.0 V of the battery becomes possible and efficiency of the battery use of about 10% can be improved by raising the voltage to 6.0 V by the booster type DC-DC conversion circuit when the battery voltage is discharged to 6.0 V and supplying it to the DC-DC conversion circuit for outputting 5.0 V.

We claim:

1. A power supply apparatus, comprising:

a battery;

a booster type DC-DC conversion circuit having an input side thereof connected to said battery, for outputting a constant voltage above an input voltage to an output side thereof when the conversion circuit is operation, and passing the input voltage to the output side thereof when the operation of the conversion circuit is inhibited;

a voltage reduction type DC-DC conversion circuit having an input side thereof connected to the output side of said booster type DC-DC conversion circuit, for generating a constant voltage lower than the input voltage to an output side thereof;

battery voltage detection means for detecting whether the voltage of said battery is above a reference value; and control means for outputting a signal for inhibiting the operation of said booster type DC-DC conversion circuit when said battery voltage detection means detects that the battery voltage is above said reference value, and a signal for operating said booster type DC-DC conversion circuit when said battery voltage detection means detects that the battery voltage is below said reference value.

2. A power supply apparatus comprising:

a battery;

a booster type DC-DC conversion circuit having an input side thereof connected to said battery, for outputting a constant voltage above an input voltage to an output side thereof when the conversion circuit is operation, and passing the input voltage to the output side thereof when the operation of the conversion circuit is inhibited;

a voltage reduction type DC-DC conversion circuit having an input side thereof connected to the output side of said booster type DC-DC conversion circuit, for generating a constant voltage lower than the input voltage to an output side thereof;

external terminals for connecting an external D.C. power supply, connected to the input side of said voltage reduction type DC-DC conversion circuit;

external voltage detection means for detecting whether a voltage between said external terminals is above a reference value;

battery voltage detection means for detecting whether or not the voltage of said battery is above a reference value; and control means for outputting a signal for operating said booster type DC-DC conversion circuit only when said external voltage detection means detects that the external voltage is below said reference value and said battery voltage detection means detects that the battery voltage is below said reference value.

3. A power supply apparatus according to claim 2, which further comprises a blocking diode interposed between said external terminal and the input side of said voltage reduction type DC-DC conversion circuit, and a blocking diode interposed between said battery and said voltage reduction type DC-DC conversion circuit.

4. A power supply apparatus according to claim 2, which further comprises a charger connected between said external terminal and said battery.

5. An electronic apparatus including a power supply apparatus, said power supply apparatus comprising:

a battery;

a booster type DC-DC conversion circuit having an input side thereof connected to said battery, for outputting a constant voltage above an input voltage to an output side thereof when the conversion circuit is operation, and passing the input voltage to the output side thereof when the operation of the conversion circuit is inhibited;

a voltage reduction type DC-DC conversion circuit having an input side thereof connected to the output side of said booster type DC-DC conversion circuit, for generating a constant voltage lower than an input voltage to an output side thereof;

battery voltage detection means for detecting whether or not the voltage of said battery is above a reference value; and control means for outputting a signal for inhibiting the operation of said booster type DC-DC conversion circuit when said battery voltage detection means detects that the battery voltage is above said reference value, and a signal for operating said booster type DC-DC conversion circuit when said battery voltage detection means detects that the battery voltage is below said reference value.

6. An electronic apparatus including a power supply apparatus, said power supply apparatus comprising:

a battery;

a booster type DC-DC conversion circuit having an input side thereof connected to said battery, for outputting a constant voltage above an input voltage to an output side thereof when the conversion circuit is operation, and passing the input voltage to the output side thereof when the operation of the conversion circuit is inhibited;

a voltage reduction type DC-DC conversion circuit having an input side thereof connected to the output side of said booster type DC-DC conversion circuit, for generating a constant voltage lower than an input voltage to an output side thereof;

external terminals connected to the input side of said voltage reduction type DC-DC conversion circuit, for connecting an external D.C. power supply;

external voltage detection means for detecting whether or not a voltage between said external terminals is above a reference value;

battery voltage detection means for detecting whether or not the voltage of said battery is above a reference value; and control means for outputting a signal for operating said booster type DC-DC conversion circuit only when said external voltage detection means detects that the external voltage is blow the reference value and said battery voltage detection means detects that the battery voltage is below the reference value.

7. An electronic apparatus according to claim 6, which further comprises a locking diode interposed between said external terminal and the input side of said voltage reduction type DC-DC conversion circuit, and a blocking diode interposed between said battery and said voltage reduction type DC-DC conversion circuit.

8. An electronic apparatus according to claim 6, which further comprises a charger connected between said external terminal and said battery.

* * * * *